United States Patent
Inoue et al.

(10) Patent No.: US 9,441,064 B2
(45) Date of Patent: Sep. 13, 2016

(54) CURABLE COMPOSITION, TRANSPARENT HEAT-RESISTANT MATERIAL, AND USE THEREOF

(71) Applicant: SHOWA DENKO K.K., Tokyo (JP)

(72) Inventors: Hirofumi Inoue, Tokyo (JP); Miyo Mukobayashi, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/771,010

(22) PCT Filed: Feb. 27, 2014

(86) PCT No.: PCT/JP2014/054793
§ 371 (c)(1),
(2) Date: Aug. 27, 2015

(87) PCT Pub. No.: WO2014/133052
PCT Pub. Date: Sep. 4, 2014

(65) Prior Publication Data
US 2016/0017076 A1     Jan. 21, 2016

(30) Foreign Application Priority Data

Feb. 28, 2013  (JP) .................................. 2013-039075
Sep. 26, 2013  (JP) .................................. 2013-199325

(51) Int. Cl.
| C08F 2/50 | (2006.01) |
| C08F 2/46 | (2006.01) |
| C08G 61/04 | (2006.01) |
| C08F 222/10 | (2006.01) |
| C08F 216/12 | (2006.01) |
| C09D 4/00 | (2006.01) |

(52) U.S. Cl.
CPC ..... *C08F 222/1006* (2013.01); *C08F 216/125* (2013.01); *C09D 4/00* (2013.01); *C08F 2222/104* (2013.01)

(58) Field of Classification Search
CPC ...................... C08F 222/1006; C08F 222/104
USPC ................. 522/64, 6, 189, 184, 1, 71; 520/1
See application file for complete search history.

(56) References Cited

U.S. PATENT DOCUMENTS

| 7,989,563 B2 | 8/2011 | Nakabayashi et al. | |
| 2003/0236375 A1* | 12/2003 | Salamone | A61L 27/16 526/307.5 |
| 2006/0003261 A1* | 1/2006 | Imai | C08F 22/105 430/288.1 |
| 2009/0166589 A1* | 7/2009 | Kadowaki | C08J 5/18 252/500 |
| 2009/0209718 A1* | 8/2009 | Nakabayashi | C08F 220/18 526/325 |

FOREIGN PATENT DOCUMENTS

| JP | 3-247613 A | | 11/1991 |
| JP | 4-159314 A | | 6/1992 |
| JP | 4-159325 A | | 6/1992 |
| JP | 2007-299739 A | | 11/2007 |
| JP | 2008-44357 A | | 2/2008 |
| JP | 2009-132787 | * | 6/2009 |
| JP | 2009-132787 A | | 6/2009 |
| JP | 2009-197102 A | | 9/2009 |
| JP | 2010-084008 | * | 4/2010 |
| JP | 2010-84008 A | | 4/2010 |
| JP | 2011-022490 | * | 2/2011 |
| JP | 2011-22490 A | | 2/2011 |
| WO | 02/33447 A1 | | 4/2002 |
| WO | 2007/117030 A1 | | 10/2007 |
| WO | 2008/010588 A1 | | 1/2008 |
| WO | 2008062903 A1 | | 5/2008 |
| WO | 2013-035891 | * | 3/2013 |
| WO | 2014-021283 | * | 2/2014 |

OTHER PUBLICATIONS

Nakabayashi, JP 2009-132787 Machine Translation, Jun. 18, 2009.*
Okumura, JP 2010-084008 Machine Translation, Apr. 15, 2010.*
Kamijo et al, JP 2011-022490 Machine Translation, Feb. 3, 2011.*
Inoue et al, WO 2013035891 Machine Translation, Mar. 14, 2013.*
Hirofumi et al, WO 2014-21283 Machine Translation, Feb. 6, 2014.*
International Preliminary Report on Patentability dated Sep. 11, 2015, issued by the International Bureau in corresponding International Application No. PCT/JP2014/054793.
International Search Report for PCT/JP2014/054793 dated Apr. 28, 2014.
Extended European Search Report dated Jul. 5, 2016, from the European Patent Office in European Application No. 14756672.3.

* cited by examiner

Primary Examiner — Ling Choi
Assistant Examiner — Jessica E Whiteley
(74) Attorney, Agent, or Firm — Sughrue Mion, PLLC

(57) ABSTRACT

The present invention provides a curable composition, which contains a crosslinking aid (B) containing three or more allyl groups in the molecule in an amount of 1 to 50 parts by mass, polyfunctional (meth)acrylic compound (C) in an amount of 5 to 50 parts by mass, and photopolymerization initiator (D1) and/or thermal polymerization initiator (D2) in an amount of 0.1 to 10 parts by mass, respectively, as a polymerization initiator (D) to 100 parts by mass of allyl group-terminated allyl ester oligomer (A);
wherein the crosslinking aid (B) containing allyl group is a compound containing three or more allyl groups in a molecule;
wherein the content of impurities derived from the crosslinking aid (B) in the curable composition is less than 0.1 mass %;
wherein the content of the (meth)acrylic compound containing a hydroxyl group in a molecule (C1) in the curable composition is 0.5 to 30 mass %.

8 Claims, No Drawings

CURABLE COMPOSITION, TRANSPARENT HEAT-RESISTANT MATERIAL, AND USE THEREOF

CROSS REFERENCE TO RELATED APPLICATIONS

This application is a National Stage of International Application No. PCT/JP2014/054793 filed Feb. 27, 2014 (claiming priority based on Japanese Patent Application No. 2013-039075 filed Feb. 28, 2013 and Japanese Patent Application No. 2013-199325 filed Sep. 26, 2013), the contents of which are incorporated herein by reference in their entirety.

TECHNICAL FIELD

The present invention relates to a curable composition. Specifically, the present invention relates to a curable composition which is capable of obtaining an optical resin film or sheet being excellent in heat discoloration resistance, transparency and surface hardness; a transparent heat-resistant material obtained by curing the composition; and the use of the transparent heat-resistant material.

BACKGROUND ART

Conventionally, a cured product obtained by polymerizing and curing a polyallyl ester compound containing multiple allyl ester groups in a molecule is excellent in transparency, heat resistance, electric properties and light resistance, and has been used for optical materials, electronics, artificial marble, decorative laminates and an anti-cracking agent for unsaturated polyester resin. For example, Patent Document 1 (WO 02/33447) (EP 1331494) and Patent Document (JP 2009-197102 A) (U.S. Pat. No. 7,989,563) disclose an optical lens and film using a polyallyl ester compound, Patent Document 3 (JP 2011-22490 A), Patent Document 4 (JP 2008-44357 A) (WO 2008/010588) and Patent Document 5 (JP 2007-299739 A) (WO 2007/117030) disclose a substrate using a polyallyl ester compound, and Patent Document 6 (JP 2010-84008 A) discloses a semiconductor device using a polyallyl ester compound as an adhesive, respectively.

In recent years, there has been a strong demand for higher functionality, downsizing, thinner size and reduction in weight in electronics represented by mobile phones and thin-screen televisions, and studies have been made on substitution of resin members for glass members in optical materials used in the electronics. Heat resistance and transparency near to those of glass, and the characteristics of being lighter in weight and more difficult to break compared to glass are required for resin used as a substitute for glass.

Examples of resin used as a substitute for glass include polyethylene terephthalate (PET) and polycarbonate (PC) in terms of good mechanical strength and excellent transparency. However, the glass transition temperature of the resin is about 70° C. and 140° C., respectively, and it cannot be said that the heat resistance of the resin is sufficient, which has limited their usefulness.

Although the cured product obtained by polymerizing and curing a polyallyl ester compound has higher heat resistance and transparency compared to polyethylene terephthalate (PET) and polycarbonate (PC), it cannot be said that the cured product has sufficient surface hardness depending for use in a front panel of a display unit and the like, and there has been a strong demand for a surface hardness near to that of glass in addition to transparency and heat resistance.

PRIOR ART

Prior Art Documents

Patent Documents

[Patent Document 1] WO 02/33447 (EP 1331494)
[Patent Document 2] JP 2009-197102 A (U.S. Pat. No. 7,989,563)
[Patent Document 3] JP 2011-22490 A
[Patent Document 4] JP 2008-44357 A (WO 2008/010588)
[Patent Document 5] JP 2007-299739 A (WO 2007/117030)
[Patent Document 6] JP 2010-84008 A

DISCLOSURE OF THE INVENTION

Problems to be Solved by the Invention

An objective of the present invention is to provide a curable composition which is suitable for the production of a film, sheet or plate having a transparency required for optical applications, high surface hardness, excellent heat resistance and low linear expansion coefficient, obtained by curing a polyallyl ester compound.

Means to Solve the Problem

As a result of intensive study on a curable composition comprising a polyallyl ester compound as a polymerizable component to solve the above problem, the present inventors have accomplished the present invention by blending as a crosslinking aid a compound containing a specific allyl group such as triallyl isocyanurate (TRIC) or triallyl cyanurate (TAC) and using a polyfunctional (meth)acrylic compound containing a hydroxyl group in combination.

That is, the present invention relates to the curable composition in [1] to [4] below, the transparent heat-resistant material in [5] and the use of the transparent heat-resistant material in [6].

[1] A curable composition, which contains a crosslinking aid (B) containing an allyl group in an amount of 0.5 to 100 parts by mass, polyfunctional (meth)acrylic compound (C) in an amount of 5 to 50 parts by mass, and photopolymerization initiator (D1) and/or thermal polymerization initiator (D2) in an amount of 0.1 to 10 parts by mass, respectively, as a polymerization initiator (D) to 100 parts by mass of allyl group-terminated allyl ester oligomer (A);

wherein allyl group-terminated allyl ester oligomer has a group represented by formula (1) as terminus

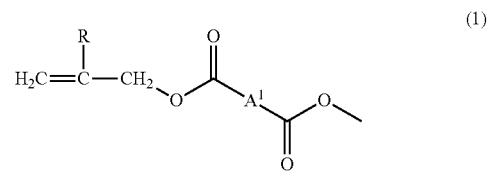

(in the formula, R represents a hydrogen atom or methyl group, $A^1$ represents one or more kinds of organic residue having an alicyclic structure and/or an aromatic ring structure derived from dicarboxylic acid);

and contains a component comprising a structure represented by formula (2) as a constituent unit;

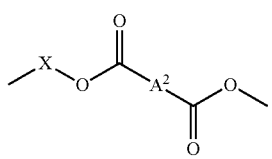

(in the formula, $A^2$ represents one or more kinds of organic residue having an alicyclic structure and/or an aromatic ring structure derived from dicarboxylic acid, X represents one or more kinds of organic residue derived from polyhydric alcohol, with a proviso that X may have a branched structure through ester bonds, having a group represented by formula (1) as terminus and a structure represented by formula (2) as constituent unit), wherein the crosslinking aid (B) containing allyl group is a compound containing three or more allyl groups in a molecule;

wherein the content of impurities derived from the crosslinking aid (B) in the curable composition is less than 0.1 mass %;

wherein the polyfunctional (meth)acrylic compound (C) includes a polyfunctional (meth)acrylic compound containing a hydroxyl group in a molecule (C1) and wherein the content of the (meth)acrylic compound containing a hydroxyl group in a molecule (C1) in the curable composition is 0.5 to 30 mass %.

[2] The curable composition as described in [1] above, wherein the crosslinking aid (B) is at least one member selected from triallyl isocyanurate (TRIC) and triallyl cyanurate (TAC).

[3] The curable composition as described in [1] or [2] above, wherein the polyfunctional (meth)acrylic compound containing a hydroxyl group (C1) mainly comprises (meth)acrylate monomer or oligomer containing three or more (meth)acryloyloxy groups.

[4] The curable composition as described in any one of [1] to [3] above, wherein impurities derived from the crosslinking aid (B) contain a compound having two or less allyl groups in a molecule.

[5] A transparent heat-resistant material obtained by curing the curable composition described in any one of [1] to [4] above by irradiating light and/or by heating.

[6] An optical film, optical sheet, optical waveguide, optical lens, optical encapsulant, optical adhesive, light guide plate, window material or jig to prevent solder from scattering using the transparent heat-resistant material described in [5] above.

Effects of the Invention

By polymerizing and curing the curable composition of the present invention, it is possible to obtain a film or sheet material having a transparency required for optical applications, high surface hardness, excellent heat resistance and low linear expansion coefficient.

MODE FOR CARRYING OUT THE INVENTION

Hereinafter, the present invention is described in details.
The curable composition of the present invention is characterized in containing components (A) to (D) as follows.

(A) Allyl Group-Terminated Allyl Ester Oligomer

The allyl group-terminated allyl ester oligomer (A), which is a main component of the curable composition of the present invention and contributes to achieving heat resistance of the cured product, includes allyl ester oligomer which contains a group represented by formula (1) as terminus

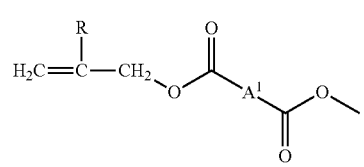

(in the formula, R represents a hydrogen atom or methyl group, $A^1$ represents one or more kinds of organic residue having an alicyclic structure and/or an aromatic ring structure derived from dicarboxylic acid);
and contains a component comprising a structure represented by formula (2) as a constituent unit;

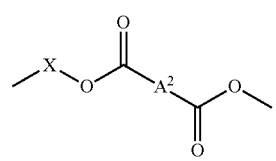

(in the formula, $A^2$ represents one or more kinds of organic residue having an alicyclic structure and/or an aromatic ring structure derived from dicarboxylic acid, X represents one or more kinds of organic residue derived from polyhydric alcohol, with a proviso that X may have a branched structure through ester bonds, having a group represented by formula (1) as terminus and a structure represented by formula (2) as constituent unit.

In the above allyl ester oligomer, there are at least two terminuses represented by formula (1), but in a case where X in formula (2) has a branched structure, there are three or more. In this case, as there are multiple terminuses, there are multiple R's. These R's do not have to be of the same kind with each other, and the structure may include an allyl group as one terminus in which R is a hydrogen atom and a methallyl group as another terminus in which R is a methyl group. Moreover, all the R's do not necessarily have to be an allyl group or a methallyl group. In an extent that does not impair curability, some of the R's may be a non-polymerizable group such as methyl group and ethyl group.

Similarly, with respect to the structure represented by $A^1$, the terminuses may be different from each other. For example, the structure may include a benzene ring as one terminus $A^1$ when there is a cyclohexane ring as another terminus.

$A^1$ and $A^2$ in formulae (1) and (2) are one or more kinds of organic residue having an alicyclic structure and/or an aromatic ring structure derived from dicarboxylic acid. The portion derived from dicarboxylic acid is shown as carbonyl structure adjacent to $A^1$. Therefore, $A^1$ and $A^2$ show a benzene skeleton or a cyclohexane skeleton.

At least one constituent unit represented by formula (2) is required in allyl ester oligomer. It is preferred that the molecular weight of the whole allyl ester oligomer be increased to a certain level by repetition of this unit, so that appropriate viscosity may be obtained, enhancing workability and ductility of cured product. However, when the molecular weight becomes excessively high, it increases the molecular weight between the crosslinking points in the cured product, which lowers glass transition temperature (Tg) and may decrease the heat resistance. It is critical to adjust the molecular weight appropriately depending on the intended use.

A preferred range of the number-average molecular weight of the allyl ester oligomer (A) measured by the GPC is from 500 to 200,000, more preferably from 1000 to 100,000.

There is no particular limitation on dicarboxylic acid from which $A^1$ and $A^2$ structures are derived from. From the viewpoint of ready availability of raw materials, terephthalic acid, isophthalic acid, phthalic acid, 1,4-cyclohexane dicarboxylic acid, 1,2-cyclohexane dicarboxylic acid, 1,4-naphthalene dicarboxylic acid, 1,5-naphthalenedicarboxylic acid, 2,6-naphthalene dicarboxylic acid, 2,7-naphthalene dicarboxylic acid, diphenyl-m,m'-dicarboxylic acid, diphenyl-p,p'-dicarboxylic acid, benzophenone-4,4'-dicarboxylic acid, p-phenylene diacetate, p-carboxyphenyl acetate, methyl terephthalic acid and tetrachlorophthalic acid are preferred. In view of heat resistance, terephthalic acid, isophthalic acid, phthalic acid, 1,2-cyclohexane dicarboxylic acid, 1,3-cyclohexane dicarboxylic acid, 1,4-cyclohexane dicarboxylic acid, norbornene dicarboxylic acid, bicyclodecane dicarboxylic acid, endomethylene tetrahydrophthalic acid and methyl tetrahydrophthalic acid are more preferred. It is desirable to use dicarboxylic acid not containing an aromatic ring in a molecule in view of light resistance, and using 1,4-cyclohexane dicarboxylic acid is suitable for applications requiring high transparency.

Also, in addition to dicarboxylic acid from which $A^1$ structure is derived from, other dicarboxylic acids, which do not contain a cyclic structure, such as maleic acid, fumaric acid, itaconic acid, citraconic acid, endic anhydride, chlorendic anhydride or the like may be used in combination within an extent that does not impair the effects of the present invention.

X in formula (2) represents one or more kinds of organic residue derived from polyhydric alcohol. A polyhydric alcohol is a compound having two or more hydroxyl groups and X itself represents the skeleton portion of polyhydric alcohol excluding hydroxyl groups. Further, in the polyhydric alcohol, since at least two hydroxyl groups have to be bonded, some hydroxyl groups may remain unreacted when the polyhydric alcohol has a valence of three or more. i.e. it has three or more hydroxyl groups. polyhydric alcohol has 2 to 20 carbon atoms and preferred is polyhydric alcohol having 2 to 6 hydroxyl groups.

Among polyhydric alcohol having 2 to 20 carbon atoms, examples of dihydric alcohol include ethylene glycol, propylene glycol, 1,3-propane diol, 1,3-butane diol, 1,4-butane diol, 1,5-pentane diol, neopentyl glycol, hexamethylene glycol, 1,6-hexane diol, 1,4-cyclohexane dimethanol, 2-methyl-1,3-propane diol, 3-methyl-1,5-pentane diol, diethylene glycol, dipropylene glycol, triethylene glycol, polyethylene glycol, ethylene oxide adduct of bisphenol A, propylene oxide adduct of bisphenol A, hydrogenated bisphenol A, 2,2-[4-(2-hydroxyethoxy)-3,5-dibromophenyl] propane.

Examples of trihydric or higher polyhydric alcohol include glycerin, trimethylolpropane, trimethylolethane, pentaerythritol and dipentaerythritol. Polyhydric alcohol may be a mixture of two or more thereof.

With respect to the constituent unit represented by formula (2) in the allyl ester oligomer, one type of the constituent unit may be repeated or different types of the unit may be included. That is, the allyl ester oligomer may be a copolymer type. In this case, in one allyl ester oligomer, several kinds of X exist. For example, the structure may include a residue derived from propylene glycol as one X and another residue derived from trimethylol propane as another X. In this case, allyl ester oligomer has branches at trimethylol propane residue. Two or more types of $A^2$ may exist as well. A structural formula, in a case where R is a hydrogen atom, $A^1$ and $A^2$ are residues derived from isophthalic acid, X is propylene glycol or trimethylol propane, is shown below.

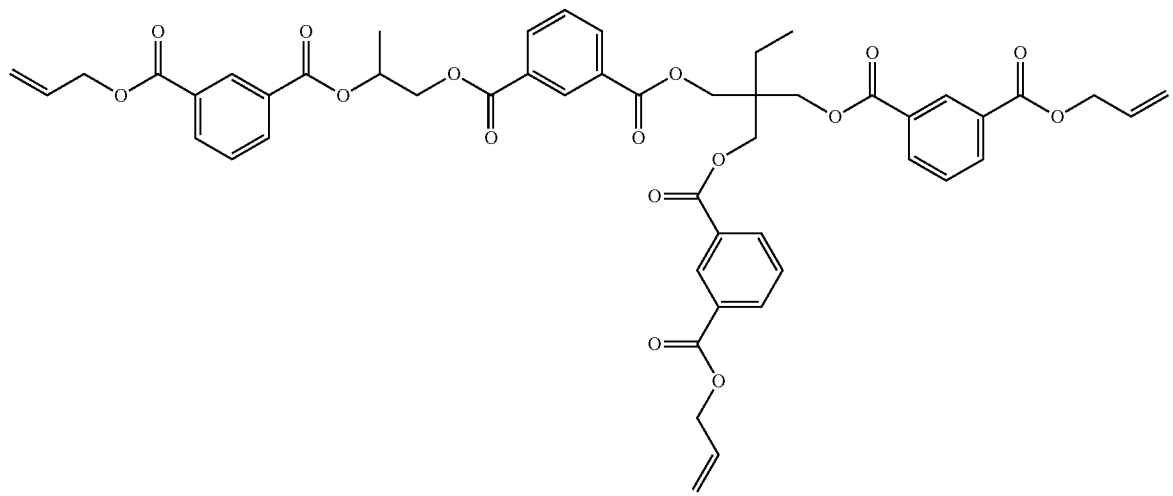 [SMILES: C=CCOC(=O)c1cccc(C(=O)OCC(CC)(COC(=O)c2cccc(C(=O)OCC=C)c2)COC(=O)c2cccc(C(=O)OCC(C)OC(=O)c3cccc(C(=O)OCC=C)c3)c2)c1]

[Method for Producing Allyl Ester Oligomers]

The allyl ester oligomers used in the present invention can be produced by transesterification of allyl ester monomers of dicarboxylic acid and polyhydric alcohol having two or more hydroxyl groups. Allyl ester monomers of dicarboxylic acid are an ester compound comprising dicarboxylic acid and (meth)allyl alcohol. Specifically, examples thereof include diallyl terephthalate, diallyl isophthalate, diallyl phthalate, diallyl 1,4-naphthalenedicarboxylate, diallyl 1,5-naphthalenedicarboxylate, diallyl 2,6-naphthalenedicarboxylate, diallyl 2,7-naphthalenedicarboxylate, diallyl diphenyl-m,m'-dicarboxylate, diallyl diphenyl-p,p'-dicarboxylate, diallyl benzophenone-4,4'-dicarboxylate, diallyl p-phenylenediacetate, diallyl p-carboxyphenylacetate, diallyl methylterephthalate, diallyl tetrachlorophthalate, diallyl 1,2-cyclohexanedicarboxylate, diallyl 1,3-cyclohexane dicarboxylate, diallyl 1,4-cyclohexane dicarboxylate, diallyl norbornenedicarboxylate, diallyl bicyclodecanedicarboxylate, diallyl endomethylenetetrahydrophthalate, diallyl methyltetrahydrophthalate, diallyl adipate, diallyl succinate and diallyl maleate. Two or more of these allyl ester monomers may be used in combination as needed.

As polyhydric alcohol, polyhydric alcohol which induces the above-mentioned X structure is used. To obtain an allyl ester oligomer having (meth)allyl ester group at the terminal, with respect to the use ratio, the amount of the hydroxyl group of polyhydric alcohol to be used needs to be less than that of the carboxyl group of dicarboxylic acid.

As a catalyst for transesterification reaction to produce allyl ester oligomers to be used in the present invention, a conventionally-known transesterification reaction catalyst can be used. Specific examples thereof include oxide and weak acid salt of alkali metal and alkaline earth metal, and oxide and salt of weak acid thereof; oxide, hydroxide, inorganic acid salt, alcoholate and organic acid salt of manganese (Mn), zinc (Zn), cadmium (Cd), zirconium (Zr), lead (Pb), titanium (Ti), cobalt (Co) and tin (Sn); and organic tin compounds such as dibutyl tin oxide, dioctyl tin oxide, dibutyl tin dichloride. Among these, dibutyl tin oxide and dioctyl tin oxide are preferable.

The amount of catalyst used varies depending on the activity of the catalyst, and a catalyst is used in such an amount that can distil away allyl alcohol at an appropriate rate. Generally, a catalyst is used in an amount of 0.0001 to 1 mass %, and preferably about 0.001 to 0.5 mass % to allyl ester monomer of polycarboxylic acid.

There is no particular limitation on the reaction temperature in the production process, and the reaction temperature is preferably within the range from 120 to 230° C., more preferably within the range from 140 to 200° C. As an embodiment of the reaction, it is necessary to perform the reaction under reduced pressure or while passing the allyl alcohol generated as a side product out of the reaction system by using an appropriate solvent, to thereby accelerate the reaction. A specific method for producing allyl ester oligomers is disclosed, for example, in JP H06-74239 B.

(B) Cross-Linking Aid

The curable composition of the present invention contains allyl group-containing crosslinking aid (B). Allyl group-containing crosslinking aid (B) is a compound having three or more allyl groups in a molecule, and specific examples thereof include triallyl isocyanurate (TRIC) or triallyl cyanurate (TAC), and a polyallyl compound in which these compounds, diallyl phthalate, diallyl fumarate, diallyl maleate and the like are condensed. Among these, triallyl isocyanurate (TRIC) and triallyl cyanurate (TAC) are particularly preferable in view of crosslinking properties and durability.

In some cases, compounds having only one or two allyl groups are contained as impurities in the crosslinking aid. For example, impurities contained in triallyl isocyanurate (TRIC) include diallyl isocyanurate having two allyl groups in a molecule, allyl isocyanurate having one allyl group in a molecule and other isocyanurate compounds having no allyl group in a molecule.

The present inventors have confirmed that the purity of the crosslinking aid has an effect on the heat discoloration resistance of the transparent heat-resistant material obtained by curing the composition. That is, it is desirable that the content of the above-mentioned impurity components present in the curable composition be less than 0.1 mass %. When the content of the impurity components is 0.1 mass % or more, it reduces the heat discoloration resistance of the transparent heat-resistant material obtained by curing the composition by irradiating light and/or by heating.

One kind of the crosslinking aid as component (B) may be used singly or two or more thereof may be mixed or used in combination. There is no particular limitation on the amount of the crosslinking aids to be used, and the amount is 0.5 to 100 parts by mass, preferably 1 part by mass to 50 parts by mass, to 100 parts by mass of allyl group-terminated allyl ester oligomer (A). When the amount of the crosslinking aids to be used is less than 0.5 parts by mass, it decreases the crosslinking degree, resulting in insufficient surface hardness and heat resistance. When the amount of the crosslinking aids to be used exceeds 100 parts by mass, it makes the crosslinking degree too high, thereby resulting in decrease in flexibility and bendability in some cases.

(C) Polyfunctional (Meth)Acrylic Compound

The curable composition of the present invention contains polyfunctional (meth)acrylic compound (C) as being a component contributing to attaining high surface hardness of the cured product. In the present specification, polyfunctional (meth)acrylic compound (C) means an organic compound having two or more (meth)acryloyloxy groups.

In the present specification, a (meth)acrylic compound means a methacrylic compound or an acrylic compound. Similarly, (meth)acrylate means methacrylate or acrylate, and a (meth)acryloyloxy group means a methacryloyloxy group or an acryloyloxy group.

As polyfunctional (meth)acrylic compound (C), (meth)acrylate monomer having 10 to 30 carbon atoms and having three or more (meth)acryloyloxy groups or oligomer thereof is preferable in view of dimensional stability, and a compound having an aliphatic or alicyclic structure having no aromatic ring in a molecule is preferable in view of transparency.

Specifically, examples thereof include trimethylolpropane tri(meth)acrylate, ditrimethylolpropane tetra(meth)acrylate, pentaerythritol tetra(meth)acrylate, dipentaerythritol hexa(meth)acrylate, tris(2-hydroxyethyl) isocyanurate tri(meth)acrylate, trimethylolpropane tri(meth)acrylate, ethoxylated trimethylolpropane tri(meth)acrylate and propoxylated trimethylolpropane tri(meth)acrylate. More preferable specific examples include trimethylolpropane triacrylate and dipentaerythritol hexaacrylate.

In the curable composition of the present invention, polyfunctional (meth)acrylic compound (C) includes polyfunctional (meth)acrylic compound having a hydroxyl group in a molecule (C1).

Examples of polyfunctional (meth)acrylic compound having a hydroxyl group in a molecule (C1) include pentaerythritol tri(meth)acrylate, dipentaerythritol penta(meth)acrylate, dipentaerythritol tetra(meth)acrylate, dipentaerythritol tri(meth)acrylate, dipentaerythritol di(meth)acrylate and trimethylolpropane di(meth)acrylate.

These polyfunctional (meth)acrylic compounds may be used solely or in combination of two or more of them. The content of polyfunctional (meth)acrylic compound having a hydroxyl group in a molecule (C1) is preferably 0.5 to 30 mass %, more preferably 1 to 25 mass % of the curable composition. When the content is less than 0.5 mass %, it has little effect on heat discoloration resistance, and when the content exceeds 30 mass %, it increases water absorption.

Bifunctional (meth)acrylic compounds as below, which double as a reactive diluent, may be used in combination: epoxy(meth)acrylate such as dipentaerythritol di(meth)acrylate, trimethylolpropane di(meth)acrylate, dicyclopentanyldimethylene di(meth)acrylate, 5-ethyl-2-(2-hydroxy-1,1-dimethylethyl)-5-(hydroxymethyl)-1,3-dioxa-di(meth)acrylate, neopentyl glycol di(meth)acrylate, 1,6-hexanediol di(meth)acrylate, 1,3-butanediol di(meth)acrylate, 1,4-butanediol di(meth)acrylate, ethylene glycol di(meth)acrylate, diethylene glycol di(meth)acrylate, polyethylene glycol di(meth)acrylate, tetraethylene glycol di(meth)acrylate, triethylene glycol di(meth)acrylate, propylene glycol di(meth) acrylate, hexanediol di(meth)acrylate, zinc di(meth)acrylate, bisphenol A-diglycidyl ether di(meth)acrylate, bisphenol A-ethylene oxide di(meth)acrylate adduct, hydrogenated bisphenol A-diglycidyl ether di(meth)acrylate, hydrogenated bisphenol A-ethylene oxide di(meth)acrylate adduct, bisphenol F-diglycidyl ether di(meth)acrylate, bisphenol F-ethylene oxide di(meth)acrylate adduct, hydrogenated bisphenol F-diglycidyl ether di(meth)acrylate, hydrogenated bisphenol F-ethylene oxide di(meth)acrylate adduct, neopentyl glycol diglycidyl ether di(meth)acrylate, 1,6-hexanediol diglycidyl ether di(meth)acrylate; polyester di(meth)acrylate obtained by esterification of polyhydric alcohol, polyvalent carboxylic acid and/or anhydride thereof and (meth)acrylic acid; and urethane di(meth)acrylate obtained by reacting polyhydric alcohol, polyvalent isocyanate, and hydroxyl group-containing (meth)acrylate.

The amount of polyfunctional (meth)acrylic compound to be used as being component (C) is 5 to 50 parts by mass to 100 parts by mass of allyl group-terminated allyl ester oligomer (A). When the amount of the compound to be used is less than 5 parts by mass, it results in insufficient surface hardness and heat resistance, and when the amount exceeds 50 parts by mass, it reduces flexibility and bendability.

(D) Polymerization Initiator

The curable composition of the present invention contains polymerization initiator (D) to obtain a cured product. As a polymerization initiator, either of photopolymerization initiator (D1) and thermal polymerization initiator (D2) may be used solely, or both of them may be used in combination.

As a photopolymerization initiator (D1), known photo-cleavage type and/or hydrogen-abstraction type initiators, which are readily cleavable by known ultraviolet irradiation to thereby generate two radicals, may be used. These initiators may be mixed to be used. Examples of the initiator include benzophenones such as benzophenone, benzoylbenzoic acid, 4-phenylbenzophenone, hydroxybenzophenone, 4,4'-bis(diethylamino)benzophenone; benzoin alkyl ethers such as benzoin, benzoinethylether, benzoinisopropylether, benzoinbutylether and benzoinisobutylether; acetophenones such as 4-phenoxydichloroacetophenone, 4-t-butyl-dichloroacetophenone, 4-t-butyl-trichloroacetophenone, diethoxyacetophenone and 2-benzyl-2-dimethylamino-1-(4-morpholinophenyl)-butanone-1; thioxanthones such as thioxanthone, 2-chlorothioxanthone, 2-methyl thioxanthone and 2,4-dimethyl thioxanthone;
alkyl anthraquinones such as ethyl anthraquinone and butyl anthraquinone; benzyldimethylketals such as 2,2-dimethoxy-1,2-diphenylethane-1-one; α-aminoketones such as 2-methyl-1-[4-(methylthio)phenyl]-2-morpholinopropane-1-one and 2-benzyl-2-dimethylamino-1-(4-morpholinophenyl)-butanone-1; and α-hydroxyketones such as 2-hydroxy-2-methyl-1-phenyl-propane-1-one, 1-[4-(2-hydroxyethoxy) phenyl]-2-hydroxy-2-methyl-propane-1-one; and 9,10-phenanthrenequinone. These initiators may be used solely or a mixture of two or more thereof may be used.

The blending quantity of the photopolymerization initiator is 0.1 to 10 parts by mass based on 100 parts by mass of allyl group-terminated allyl ester oligomer (A). When the blending quantity is less than 0.1 parts by mass, it results in insufficient photocuring capability, and when the blending quantity exceeds 10 parts by mass, it decreases solvent resistance and flexibility, and is not desirable.

In the case of polymerizing and curing the composition by ultraviolet irradiation using a photopolymerization initiator, a photosensitizer may be used in combination as needed to improve the polymerization rate. Examples of the photosensitizer used for such a purpose include pyrene, perylene, 2,4-diethyl thioxanthone, 2,4-dimethyl thioxanthone, 2,4-dichloro thioxanthone and phenothiazine. The blending quantity in the case of using a photosensitizer in combination is preferably in the range of 0.1 to 100 parts by mass based on 100 parts by mass of the photopolymerization initiator.

A known organic peroxide and azo compound can be used as thermal polymerization initiator (D2). Examples of organic peroxide include diacyl peroxides such as dibenzoyl peroxide and lauroyl peroxide; dialkyl peroxides such as di-t-butyl peroxide and dicumyl peroxide; peroxy esters such as t-butylperoxy-benzoate, t-butylperoxy-2-ethylhexanoate and t-hexylperoxy isopropyl monocarbonate; ketone peroxides such as methylethyl ketone peroxide and cyclohexanone peroxide; peroxydicarbonates such as bis(4-t-butylcyclohexyl) peroxydicarbonate and diisopropylperoxy dicarbonate; peroxymonocarbonates such as t-butylperoxy isopropyl carbonate; peroxyketals such as 1,1-bis(t-butylperoxy)-3,3,5-trimethylcyclohexane and 2,2-bis(t-butylperoxy)octane; and mixtures of two or more thereof. Among these, peroxyester organic peroxides are preferred.

Examples of azo compounds include 2,2'-azobisisobutyronitrile, 2,2'-azobisisovaleronitrile and dimethyl 2,2'-azobisisobutyrate.

These thermal polymerization initiators may be used solely or in combination of two or more thereof. The blending quantity of the thermal polymerization initiator is 0.1 to 10 parts by mass based on 100 parts by mass of allyl group-terminated allyl ester oligomer (A). When the blending quantity is less than 0.1 parts by mass, thermal curing capability becomes insufficient in some cases, and when the blending quantity exceeds 10 parts by mass, it decreases solvent resistance and flexibility, and is not desirable.

[Reactive Monomer]

In the curable composition of the present invention, a reactive monomer (reactive diluent) may be added for such purposes as control of the curing rate, adjustment of the viscosity (improvement of workability), enhancement of the crosslinking density and addition of functionalities. The reactive monomer is not particularly limited, and various kinds thereof may be used, and a monomer having a radical polymerizable carbon-carbon double bond such as a vinyl group and an allyl group is preferred for reacting with the allyl ester oligomer. Examples of such a monomer include unsaturated fatty acid ester, aromatic vinyl compounds, saturated fatty acid or aromatic carboxylic acid vinyl ester and derivatives thereof, and crosslinkable polyfunctional monomers. Among these, use of a crosslinkable polyfunctional monomer enables controlling crosslink density of the cured product. Preferred specific examples of the reactive monomer are described below.

Examples of unsaturated fatty acid ester include alkyl (meth)acrylate such as methyl (meth)acrylate, ethyl(meth) acrylate, butyl (meth)acrylate, 2-ethylhexyl(meth)acrylate, octyl (meth)acrylate, dodecyl(meth)acrylate, octadecyl (meth)acrylate, cyclohexyl(meth)acrylate and methylcyclohexyl(meth)acrylate; aromatic ester of acrylic acid such as phenyl(meth)acrylate, benzyl (meth)acrylate, 1-naphthyl (meth)acrylate, fluorophenyl (meth)acrylate, chlorophenyl (meth)acrylate, cyanophenyl (meth)acrylate, methoxyphenyl(meth)acrylate and biphenyl (meth)acrylate; haloalkyl (meth)acrylate such as fluoromethyl(meth)acrylate and chloromethyl (meth)acrylate; and glycidyl(meth)acrylate, alkylamino (meth)acrylate, and α-cyanoacrylate ester.

Examples of aromatic vinyl compounds include styrene, α-methylstyrene, chlorostyrene, styrenesulfonic acid, 4-hydroxystyrene and vinyltoluene.

Examples of vinyl ester of saturated fatty acid or aromatic vinyl ester carboxylate and derivatives thereof include vinyl acetate, vinyl propionate and vinyl benzoate.

Examples of crosslinkable polyfunctional monomers include di(meth)acrylate such as ethylene glycol di(meth) acrylate, diethylene glycol di(meth)acrylate, triethylene glycol di(meth)acrylate, tetraethylene glycol di(meth)acrylate, tripropylene glycol di(meth)acrylate, 1,3-butylene glycol di(meth)acrylate, 1,4-butanediol di(meth)acrylate, 1,5-pentanediol di(meth)acrylate, 1,6-hexanediol di(meth)acrylate, neopentyl glycol di(meth)acrylate, oligoester di(meth)acrylate, polybutadiene di(meth)acrylate, 2,2-bis(4-(meth)acryloyloxyphenyl)propane, 2,2-bis(4-(ω-(meth)acryloyloxypolyethoxy)phenyl)propane;

aromatic diallyl carboxylate such as diallyl phthalate, diallyl isophthalate, dimethallyl isophthalate, diallyl terephthalate, triallyl trimellitate, diallyl 2,6-naphthalenedicarboxylate, diallyl 1,5-naphthalanedicarboxylate, allyl 1,4-xylenedicarboxylate and diallyl 4,4'-diphenyldicarboxylate; bifunctional crosslinking monomers such as diallyl 1,4-cyclohexanedicarboxylate, diallyl 1,2-cyclohexanedicarboxylate, diallyl 1,3-cyclohexanedicarboxylate and divinyl benzene; trifunctional crosslinking monomers such as trimethylolethane tri(meth)acrylate, trimethylolpropane tri (meth)acrylate, pentaerythritol tri(meth)acrylate, tri(meth) allyl isocyanurate, tri(meth)allyl cyanurate, triallyl trimellitate and diallyl chlorendate; and a tetrafunctional or higher polyfunctional acrylate such as pentaerythritol tetra (meth)acrylate, dipentaerythritol tetra(meth)acrylate, dipentaerythritol penta(meth)acrylate and dipentaerythritol hexa (meth)acrylate, Also, bifunctional (meth)acrylic compounds as below, which double as a reactive diluent, may be used in combination: epoxy acrylate such as dipentaerythritol di(meth) acrylate, trimethylolpropane di(meth)acrylate, dicyclopentanyldimethylene diacrylate, 5-ethyl-2-(2-hydroxy-1,1-dimethylethyl)-5-(hydroxymethyl)-1,3-dioxa-diacrylate, neopentyl glycol diacrylate, 1,6-hexanediol diacrylate, 1,3-butanediol diacrylate, 1,4-butanediol diacrylate, ethylene glycol di(meth)acrylate, diethylene glycol diacrylate, polyethylene glycol diacrylate, tetraethylene glycol diacrylate, triethylene glycol diacrylate, propylene glycol di(meth)acrylate, hexanediol di(meth)acrylate, zinc diacrylate, bisphenol A-diglycidyl ether diacrylate, bisphenol A-ethylene oxide diacrylate adduct, hydrogenated bisphenol A-diglycidyl ether diacrylate, hydrogenated bisphenol A-ethylene oxide diacrylate adduct, bisphenol F-diglycidyl ether diacrylate, bisphenol F-ethylene oxide diacrylate adduct, hydrogenated bisphenol F-diglycidyl ether diacrylate, hydrogenated bisphenol F-ethylene oxide diacrylate adduct, neopentyl glycol diglycidyl ether diacrylate, 1,6-hexanediol diglycidyl ether diacrylate; polyester diacrylate obtained by esterification of polyhydric alcohol, polyvalent carboxylic acid and/or anhydride thereof and acrylic acid; and urethane diacrylate obtained by reacting polyhydric alcohol, polyvalent isocyanate, and hydroxyl group-containing acrylate.

The above-mentioned reactive monomers can be used solely or in combination of two or more of them. There is no particular limitation on the blending quantity of these reactive monomers and the blending quantity is preferably 1 to 1,000 parts by mass, more preferably 2 to 500 parts by mass, and still more preferably 5 to 100 parts by mass, based on 100 parts by mass of allyl ester oligomer (A). When the blending quantity is less than 1 part by mass, it is insufficient to obtain an effect of lowering the viscosity and the like. When the blending quantity exceeds 1,000 parts by mass, the excellent transparency of allyl ester resin may not be exhibited, and the mechanical strength inherent to allyl ester resin may be decreased in some cases. When a polyfunctional monomer is used as a reactive monomer, it leads to a lower crosslink density and insufficient heat resistance in some cases. Therefore, it is desirable to adjust the kind and blending quantity of the polyfunctional monomer depending on the required heat-resistance level.

[Radically-Reactive Resin Component]

The curable composition used in the present invention may contain a radically-reactive resin component in order to improve various physical properties. Examples of radically-reactive resin component include unsaturated polyester resin and vinyl ester resin.

Unsaturated polyester resin is a condensed product of esterification reaction of polyhydric alcohol and unsaturated polybasic acid (and saturated polybasic acid as needed), which is dissolved in a polymerizable unsaturated compound such as styrene as needed. Examples thereof include resins described at pages 16 to 18 and 29 to 37 of "Polyester Resin Handbook", The Nikkan Kogyo Shimbun Ltd., 1988. The unsaturated polyester resin can be produced by a known method.

The vinyl ester resin is also referred to as epoxy(meth) acrylate, and generally indicates a resin having a polymerizable unsaturated group, which is synthesized by a ring-opening reaction between a compound having an epoxy group represented by epoxy resin and a carboxyl group of a carboxyl compound having a polymerizable unsaturated group such as (meth)acrylic acid, or resin having a polymerizable unsaturated group, which is synthesized by a ring-opening reaction between a compound having a carboxyl group and an epoxy group of a polymerizable unsaturated compound having an epoxy group in a molecule, such as glycidyl(meth)acrylate. The details are described in "Polyester Resin Handbook", The Nikkan Kogyo Shimbun Ltd., 1988, pages 336-357 and the like. The epoxy(meth)acrylate can be produced by a known method.

Examples of epoxy resin serving as a raw material of vinyl ester resin include bisphenol A diglycidyl ether and high molecular weight homologues thereof, glycidyl ether of bisphenol A alkylene oxide adduct, bisphenol F diglycidyl ether and high molecular weight homologues thereof, glycidyl ether of bisphenol F alkylene oxide adduct, and novolak polyglycidyl ethers.

The above-mentioned radically-reactive resin component can be used solely or in combination of two or more of them. There is no particular limitation on the blending quantity of these radically-reactive resin components and the blending quantity is preferably 1 to 1,000 parts by mass, more preferably 2 to 500 parts by mass, and still more preferably 5 to 100 parts by mass, based on 100 parts by mass of allyl ester oligomer (A). When the blending quantity is less than 1 part by mass, it has little effect of improving the mechanical strength inherent to the radically-reactive resin component, and leads to decrease in workability and moldability in some cases. When the blending quantity exceeds 1,000 parts by mass, heat resistance inherent to allyl ester resin may not be exhibited.

The curable composition of the present invention may use various known additives such as ultraviolet absorbing agents, antioxidants, releasing agents, lubricants, colorants, a flame retarder, inorganic filers, organic fillers, polymerization inhibitors, thickeners, defoaming agents, leveling agents, adhesion-imparting agents in order to improve hardness, strength, moldability, durability and water resistance as long as the effects of the invention are not impaired. Particularly, additives that do not impede the light transmission are preferred.

Specific examples of ultraviolet absorbing agents include triazoles such as 2-(2'-hydroxy-tert-butylphenyl)benzotriazole, benzophenones such as 2,4-dihydroxybenzophenone, and salicylates such as 4-tert-butylphenyl salicylate.

The blending ratio of the ultraviolet absorbing agent varies depending on the kinds and amounts of the other ingredients, and generally it is preferred that the amount be 0.01 to 2 parts by mass based on 100 parts by mass of the total amount of radically polymerizable components in the curable composition of the present invention, more preferably 0.03 to 1.7 parts by mass and most preferably 0.05 to 1.4 parts by mass. When the amount of the ultraviolet absorbing agent is less than 0.01 parts by mass, a desired effect cannot be achieved, while the amount exceeding 2 parts by mass is undesirable in consideration for the cost.

Examples of the antioxidants include phenol antioxidants such as 2,6-di-tert-butyl-4-methylphenol, tetrakis-[methylene-3-(3',5'-di-tert-butyl-4-hydroxyphenyl)propionate] methane, sulfur antioxidants such as dilauryl-3,3'-thiodipropionate, phosphorous antioxidants such as tris nonylphenyl phosphite, and hindered amines such as bis-(2,2,6,6-tetramethyl-4-piperidinyl)sebacate.

The blending ratio of the antioxidant varies depending on the kinds and amounts of the other ingredients, and generally it is preferred that the amount be 0.01 to 5 parts by mass based on 100 parts by mass of the total amount of radically polymerizable components in the curable composition of the present invention, more preferably 0.05 to 4 parts by mass and most preferably 1 to 3 parts by mass. When the amount of the antioxidant is less than 0.01 parts by mass, a desired effect cannot be achieved, while the amount exceeding 5 parts by mass is undesirable in consideration for the cost.

Examples of the releasing agent include stearic acid, butyl stearate, zinc stearate, amide stearate, fluorine compounds and silicone compounds. The blending ratio of the releasing agent varies depending on the kinds and amounts of the other ingredients, and generally it is preferred that the amount be 0.01 to 2 parts by mass based on 100 parts by mass of the total amount of radically polymerizable components in the curable composition of the present invention, more preferably 0.03 to 1.7 parts by mass and most preferably 0.05 to 1.4 parts by mass. When the amount of the releasing agent is less than 0.01 parts by mass, a desired effect cannot be achieved, while the amount exceeding 2 parts by mass is undesirable in consideration for the cost.

The lubricant is not particularly limited, and products that are ordinarily used may be used. Among these, a metallic soap lubricant, a fatty acid ester lubricant, an aliphatic hydrocarbon lubricant and the like are preferred, and a metallic soap lubricant is particularly preferred. Examples of the metallic soap lubricant include barium stearate, calcium stearate, zinc stearate, barium stearate, magnesium stearate and aluminum stearate. These may be used as a composite.

Examples of the colorants include organic pigments such as anthraquinone pigment, azo pigment, carbonium pigment, quinoline pigment, quinoneimine pigment, indigoid pigment and phthalocyanine pigment; and organic dyes such as azoic dye and sulfide dye; and inorganic pigments such as titanium yellow, iron oxide yellow, zinc yellow, chromium orange, molybdenum red, cobalt purple, cobalt blue, cobalt green, chromium oxide, titanium oxide, zinc sulfide and carbon black. The blending ratio of the colorant is not particularly limited.

Examples of the flame retarders include bromine-containing compounds such as brominated epoxy compounds, acid-modified brominated epoxy compounds, acryloyl group-containing brominated epoxy compounds and acryloyl group-containing acid-modified brominated epoxy compounds; inorganic flame retarders such as red phosphorus, tin oxide, antimony compounds, zirconium hydroxide, barium metaborate, aluminum hydroxide and magnesium hydroxide; and phosphorus compound such as ammonium phosphate compounds, phosphate compounds, aromatic condensed phosphate esters, halogen-containing condensed phosphate esters, nitrogen-containing phosphorus compounds and phosphazene compounds.

The blending ratio of the flame retarder varies depending on the kinds and amounts of the other ingredients, and generally it is preferred that the amount be 10 to 50 parts by mass based on 100 parts by mass of the total amount of radically polymerizable components in the composition for an optical material. When the amount of the flame retarder is less than 10 parts by mass, a sufficient flame retardant effect cannot be expected. When the amount exceeds 50 parts by mass, it reduces the transparency of the cured product and is not desirable.

Examples of the inorganic filler include barium sulfate, barium titanate, silicon oxide powder, finely-powdered silicon oxide, crystalline silica, amorphous silica, talc, clay, magnesium carbonate, calcium carbonate, aluminum oxide, aluminum hydroxide, mica powder, glass beads, glass fiber and carbon fiber. Examples of the organic filler include acrylic resin, melamine resin, styrene resin, silicone resin, silicone rubber and fluorine resin. These inorganic and organic fillers can be used solely or in combination of two or more thereof. The fillers can be added within a scope which does not depart from the scope of the present invention: i.e. in an amount of 1 to 50 parts by mass based on 100 parts by mass of the total amount of radically polymerizable components in the curable composition of the present invention.

Furthermore, the following additives may be added within a scope which does not depart from the scope of the present invention: polymerization inhibitors such as hydroquinone, hydroquinone monomethyl ether, t-butyl catechol, pyrogallol and phenothiazine; thickeners such as silica, asbestos, Orben, Benton and montmorillonite; silicone-based, fluorine-based, acrylic or polymer defoaming agents and/or leveling agents; and adhesion-imparting agents such as imidazole-based, thiazole-based, or triazole-based silane coupling agent.

These additives are not limited to the examples and any kind of additives may be added within a scope which does not depart from the scope of the present invention.

In addition, in the method of curing the curable composition according to the present invention, solvent may be used if reduction in viscosity is necessary. Examples of solvent usable for adjusting viscosity include aromatic hydrocarbons such as toluene and xylene, esters of acetic acid such as methyl acetate, ethyl acetate, propyl acetate and butyl acetate, ketones such as acetone, methyl ethyl ketone and methyl isobutyl ketone, ethers such as tetrahydrofuran and 1,4-dioxane and alcohols such as ethyl alcohol, n-propyl alcohol, isopropyl alcohol and butyl alcohol. However, considering that a step of removing solvent is required at a later stage in a case solvent is used, it is preferred that viscosity be adjusted by using component (C) (polyfunctional (meth)acrylic compound) which can also be used as a reactive viscosity modifier.

A film or sheet and a molded body material being excellent in transparency and heat resistance can be obtained by curing the curable composition of the present invention by irradiating light and/or by heating.

Here, an article having a thickness of less than 250 μm is referred to as a film, an article having a thickness of 250 μm or more is referred to as a sheet.

In producing an optical resin film and a sheet from the curable composition of the present invention, any curing method may be employed as long as a certain surface hardness can be obtained. In order to obtain a surface hardness above a certain level, it is desirable to employ a light curing method and a thermal curing method, or a thermal curing method only, after applying the curable composition to be in the shape of a film.

There is no particular limitation to the conditions for curing the curable composition, but it is suitable to apply and cast the composition onto a transparent plastic film such as PET (polyethylene terephthalate) and PEN (polyethylene naphthalate), a metal sheet or a glass plate, followed by light curing and thermal curing, or thermal curing.

In the case of light curing, the ultraviolet irradiation method is general and, for example, it is possible to generate an ultraviolet light using an ultraviolet lamp and irradiate the composition with the light. Examples of the ultraviolet lamp include a metal halide lamp, high-pressure mercury lamp, low-pressure mercury lamp, a pulse-type xenon lamp, a mixed lamp of xenon/mercury, a low-pressure bactericidal lamp, an electrodeless lamp and an LED lamp, and any of them may be used. Among these ultraviolet lamps, preferred is a metal halide lamp or a high-pressure mercury lamp. The irradiation conditions vary according to the kind of the lamp, but the irradiation exposure is preferably about 20 to 5,000 mJ/cm$^2$. Also, it is desirable to provide the ultraviolet lamp with an ecliptic, parabolic, or diffusional reflector and with a heat shield filter as countermeasures against heat. Also, the curable composition may be heated to 30 to 80° C. in advance and irradiated with an ultraviolet light in order to accelerate curing.

In the case of thermal curing, the heating method is not particularly limited and, for example, preferred is a heating method being excellent in terms of heating uniformity, such as the heating by using a hot-air oven and a far-infrared oven. The curing temperature is about 100 to 200° C., preferably 120 to 180° C. The curing time varies depending on the curing method, and preferably 0.5 to 5 hours in the case of using a hot-air oven and 0.5 to 60 minutes in the case of using a far-infrared oven.

Since the ultraviolet cure using a photopolymerization initiator and the thermal cure using an organic peroxide and an azo compound are radical reaction, they are vulnerable to reaction inhibition due to oxygen. In order to prevent the inhibition by oxygen during the curing reaction, it is desirable to provide a transparent cover film over the curable composition after applying and casting the curable composition onto a transparent plastic film, a metal sheet or a glass plate, so as to control the oxygen concentration on the surface of the cast curable composition 1% or less. It is necessary to use a transparent cover film that has no pores on the surface, has a low oxygen permeability, and can stand the heat generated at the time of ultraviolet cure and thermal cure. For example, the film may be exemplified by films based on PET (polyethylene terephthalate), PEN (polyethylene naphthalate), PC (polycarbonate), PP (polypropylene), acetate resin, acrylic resin, polyvinyl fluoride, polyamide, polyarylate, polyethersulfone, cycloolefin polymer (norbornene resin) and the like may be used solely or in combination of two or more thereof. It should be noted that since the transparent cover film needs to be easily peeled off from the cured product, the film may be subjected to the easy-peeling treatment such as applying silicone resin or fluorine resin on the surface of these cover films.

Since the curable composition of the present invention is in the form of a liquid, it can be applied so as to obtain a certain shape and form using a known coating applicator. Examples of the coating method include gravure coating, roll coating, reverse coating, knife coating, die coating, lip coating, doctor coating, extrusion coating, slide coating, wire bar coating, curtain coating and spin coating. By using a known forming method such as cast molding method and photo fabrication, the composition can be formed into an optical lens, light guide plate, window material or jig to prevent solder from scattering. The range of the viscosity of the curable composition at the time of application, coating and forming is preferably within a range of from 100 to 100,000 mPa·s at ordinary temperatures.

In order to impart functionality to the film, sheet or formed body obtained by curing the curable composition of the present invention by irradiating light and/or by heating, they may be subjected to the surface treatment (secondary processing) such as hard coating, antifouling coating, antireflection coating, conductive coating and gas barrier coating. The film, sheet and formed body may also laminated with other members using an optical adhesive, UV adhesive and optical transparent double-sided tape. Here, the other members indicate a transparent film or sheet made of glass, PET (polyethylene terephthalate), PEN (polyethylene naphthalate), PMMA (acrylic resin), PC (polycarbonate) and cycloolefin polymers, or may be a laminate of two or more kinds of different materials.

EXAMPLES

The present invention is to be described in more details referring to Examples and Comparative Examples, but the present invention will not be limited thereto.

Various properties of the cured film obtained in Examples 1 to 4 and Comparative Examples 1 to 4 and characteristics of the used materials were evaluated by the methods as described below.

[Pencil Hardness]

The pencil hardness was measured in accordance with JIS K5600-5-4 by tilting the pencil lead sharpened in a cylindrical shape at an angle of 45° against the film, scratching the surface of the product to be measured for about 5 mm under a load of 750 g, and observing the presence or absence of a scratch. The maximum hardness of the pencil which did not make a scratch was measured as an index of the surface hardness.

[Measurement of Coefficient of Linear Thermal Expansion]

The coefficient of linear thermal expansion was measured with TMA/SS6100, produced by SII NanoTechnology Inc., in a tensile mode. A test piece in a film form had a thickness of 200 μm×4 mm×40 mm (chuck distance: 20 mm) and was applied with a tension of 30 mN, the temperature of which was increased to 200° C. at a temperature increasing rate of 5° C. per minute in an atmosphere containing 100 ml/min of nitrogen. The average coefficient of linear thermal expansion in the plane direction within a range of from 50 to 150° C. was determined (unit: ppm/K).

[Total Light Transmittance]

The total light transmittance was measured with a test sample having a thickness of 0.1 mm as an index of optical property in accordance with JIS K7361-1 using NDH-2000 manufactured by NIPPON DENSHOKU INDUSTRIES CO., LTD. In the present specification, "highly transparent" means to have a total light transmittance of 85% or higher.

[Heat Discoloration Resistance]

The cured film was subjected to thermal treatment at 220° C. for two hours using a circulating hot air dryer, and the change in the YI value before and after the treatment was calculated. The YI values were measured in accordance with ASTM E313 and using spectroscopic colorimeter SD6000 manufactured by NIPPON DENSHOKU INDUSTRIES CO., LTD.

$\Delta YI = (YI$ value of the film after the deterioration by heat$) - (YI$ value of the film before the deterioration by heat$)$

[Purity of the Crosslinking Aid]

Purity of the crosslinking aid (content of impurities derived from the crosslinking aid) was calculated from measurement by the gas chromatography mass spectrometry (GC-MS). The measurement conditions are as follows.

Apparatus: HP6890 (manufactured by Hewlett-Packard Company)

Column: DB-1MS (manufactured by Agilent J&W), length: 30 m, inner diameter: 0.32 mm, film thickness: 0.25 μm GC conditions: carrier gas: He, column temperature: 60° C. to 320° C., inlet temperature: 300° C.

[Number Average Molecular Weight of Allyl Ester Oligomer]

The number average molecular weight was measured under the following conditions.

Apparatus used: Gel permeation chromatography (GPC) system SIC-48011 manufactured by SHOWA DENKO K.K.

Column: Columns for gel permeation chromatography (GPC): K-801, K-802 and K-802.5 manufactured by SHOWA DENKO K.K.

Detector: RI-201H manufactured by SHOWA DENKO K.K.

Eluant: chloroform

Measurement method: 100 μl of the sample dissolved in chloroform was introduced to the column in which the temperature is adjusted to 40° C., to thereby measure the number average molecular weight in terms of polystyrene.

[Synthesis of Allyl Ester Oligomer (AEO)]

1,625 g of diallyl 1,4-cyclohexanedicarboxylate, 167 g of trimethylolpropane and 0.813 g of dibutyltin oxide were charged in a 2-L three-necked flask equipped with distillation apparatus, and heated under a nitrogen stream while distilling off alcohol formed at 180° C. At the time when the amount of the alcohol distilled off was about 170 g, the reaction system was gradually depressurized to 6.6 kPa (over about 4 hours) to accelerate the distillation rate of alcohol. After the distillate was substantially not generated, the reaction system was depressurized to 0.5 kPa, and the reaction was further performed for one hour, followed by cooling the reaction product. The reaction product thus obtained is referred to as "allyl ester oligomer (AEO)". The number average molecular weight determined by measuring the reaction product by GPC was 2,100.

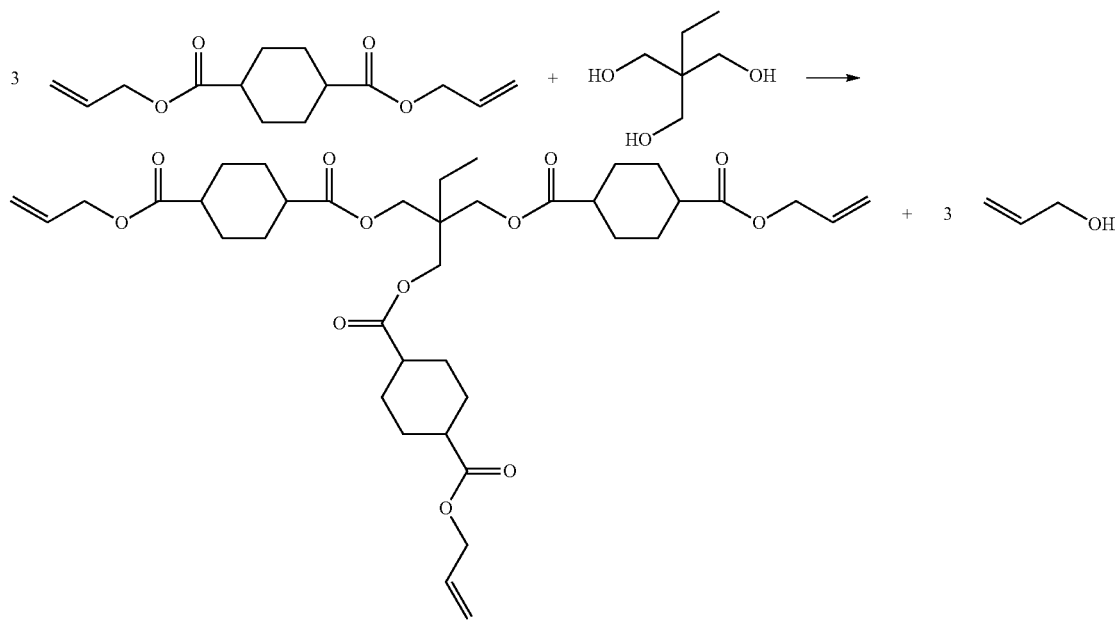

Example 1

To 100 parts by mass of the allyl group-terminated allyl ester oligomer (AEO) produced in the synthesis example, 33 parts by mass of triallyl isocyanurate (TRIC, trade name: TAICROS (registered trademark), manufactured by Evonik Japan Co., Ltd.) as an allyl group-containing crosslinking aid, 33 parts by mass of pentaerythritol triacrylate and pentaerythritol tetraacrylate (PETA, trade name: ARONIX (registered trademark) M-306, manufactured by TOAGOSEI Co., Ltd., the content of pentaerythritol triacrylate: 67 mass %) as a polyfunctional (meth)acrylic compound having a hydroxyl group in a molecule, 0.8 parts by mass of diphenyl(2,4,6-trimethoxybenzoyl)phosphine oxide (TPO, trade name: Lucirin TPO, manufactured by BASF Japan Ltd.) as a photopolymerization initiator and 1.6 parts by mass of t-hexyl peroxy isopropyl monocarbonate (PH-I, trade name: Perhexyl (registered trademark) I, manufactured by NOF Corporation) as a thermal polymerization initiator were mixed to be blended uniformly to thereby prepare an allyl ester resin composition. As a result of GC-MS measurement of the triallyl isocyanurate (molecular weight: 249, $C_{12}H_{15}N_3O_3$) (TRIC) used as a crosslinking aid in the above formulation, impurities were not detected, and the content of the polyfunctional (meth)acrylic compound having a hydroxyl group in a molecule was 13.4 mass %. The curable composition was cast onto a 0.1 mm-thick PET film and laminated with a 0.1 mm-thick PET film. The laminated film was irradiated with UV under conditions of a peak illuminance of 300 mW/cm$^2$, irradiance of 800 mJ/cm$^2$ by a UV irradiator having a metal halide lamp to thereby produce a UV cure laminated film. Furthermore, after thermal curing at 160° C. for one hour in an oven under air atmosphere, the film was cooled to room temperature. Slitting was performed at both ends of the laminated film by a CO$_2$ laser marker (apparatus name: VD7050, manufactured by Commax), and by peeling the PET films on both sides of the laminated film, a cured film having a thickness of about 0.2 mm produced by curing treatment of the curable composition was obtained.

Example 2

A cured film was produced in the same way as in Example 1 except that as a polyfunctional (meth)acrylic compound having a hydroxyl group in a molecule, the blending quantity of pentaerythritol triacrylate and pentaerythritol tetraacrylate (PETA, the content of pentaerythritol triacrylate: 67 mass %, trade name: ARONIX (registered trademark) M-306, manufactured by TOAGOSEI Co., Ltd.) was changed to 16 parts by mass and 16 parts by mass of trimethylolpropane triacrylate (TMPTA, trade name: ARONIX (registered trademark) M-309, manufactured by TOAGOSEI Co., Ltd., the content of trimethylolpropane diacrylate: less than 1 mass %) was added, to thereby evaluate characteristics of the film. The content of impurities derived from the crosslinking aid in the present preparation was not detected, and the content of the polyfunctional (meth)acrylic compound having a hydroxyl group in a molecule was 6.7 mass %.

Example 3

A cured film was produced in the same way as in Example 1 except that 33 parts by mass of triallyl cyanurate (trade name: TAC, manufactured by Kayaku Akzo Corporation) was used as an allyl group-containing crosslinking aid, to thereby evaluate characteristics of the film. As a result of GC-MS measurement of the triallyl cyanurate (molecular weight: 249, $C_{12}H_{15}N_3O_3$) (TAC) as a crosslinking aid used in the present preparation, the impurity content was 0.2 mass %. Accordingly, the impurity content in the composition was 0.05 mass % and the content of polyfunctional (meth)acrylic compound having a hydroxyl group in a molecule was 13.4 mass %.

Example 4

A cured film was produced in the same way as in Example 1 except that diphenyl(2,4,6-trimethoxybenzoyl)phosphine oxide (TPO, trade name: Lucirin TPO, manufactured by BASF Japan Ltd.) as a photopolymerization initiator and t-hexyl peroxy isopropyl monocarbonate (PH-I, trade name: Perhexyl (registered trademark) I, manufactured by NOF Corporation) as a thermal polymerization initiator were used in amounts of 0.4 parts by mass and 3.3 parts by mass, respectively, to thereby evaluate characteristics of the film. As a result of GC-MS measurement of the triallyl isocyanurate (molecular weight: 249, $C_{12}H_{15}N_3O_3$) (TRIC) as a crosslinking aid used in the present preparation, the impurity was not detected and the content of polyfunctional (meth) acrylic compound having a hydroxyl group in a molecule was 13.4 mass %.

Comparative Example 1

A cured film was produced in the same way as in Example 1 except that triallyl isocyanurate (trade name: TRIC; manufactured by Nippon Kasei Chemical Company Limited) was used as an allyl group-containing cross linking aid, to thereby evaluate characteristics of the film. As a result of GC-MS measurement of the triallyl isocyanurate (molecular weight: 249, $C_{12}H_{15}N_3O_3$) (TAIC) as a crosslinking aid used in the present preparation, the impurity content was 0.5 mass %. Accordingly, the impurity content in the composition was 0.1 mass % and the content of polyfunctional (meth)acrylic compound having a hydroxyl group in a molecule was 13.4 mass %. As a result of GC-MS measurement of the triallyl isocyanurate (TRIC), diallyl isocyanurate (molecular weight: 209, $C_9H_{11}N_3O_3$) was contained in the impurities.

Comparative Example 2

A cured film was produced in the same way as in Example 2 except that triallyl isocyanurate (trade name: TRIC; manufactured by Nippon Kasei Chemical Company Limited) used in Comparative Example 1 was used as an allyl group-containing cross linking aid, to thereby evaluate characteristics of the film. As a result of GC-MS measurement of the triallyl isocyanurate (molecular weight: 249, $C_{12}H_{15}N_3O_3$) (TRIC) as a crosslinking aid used in the present preparation, the impurity content was 0.5 mass %. Accordingly, the impurity content in the composition was 0.1 mass % and the content of polyfunctional (meth)acrylic compound having a hydroxyl group in a molecule was 6.7 mass %.

Comparative Example 3

A cured film was used in the same way as in Example 1 except that trimethylolpropane triacrylate (TMPTA, trade name: ARONIX M-309, manufactured by TOAGOSEI Co., Ltd., the content of trimethylolpropane diacrylate: less than 1 mass %) was used instead of PETA as a polyfunctional (meth)acrylate compound having a hydroxyl group in a molecule, to thereby evaluate the characteristics of the film. The impurities derived from the crosslinking aid in the present preparation was below the detection limit and the content of the polyfunctional (meth)acrylic compound having a hydroxyl group in a molecule was less than 1 mass %.

Comparative Example 4

A cured film was used in the same way as in Comparative Example 3 except that an allyl group-containing crosslinking aid was not used and the amount of trimethylolpropane triacrylate (TMPTA, trade name: ARONIX M-309, manufactured by TOAGOSEI Co., Ltd., the content of trimethylolpropane diacrylate: less than 1 mass %) was used in an amount of 25 parts by mass, to thereby evaluate the characteristics of the film. The impurities derived from the crosslinking aid in the present preparation was 0 mass % and the content of the polyfunctional (meth)acrylic compound having a hydroxyl group in a molecule was less than 1 mass %.

The composition of each of the curable compositions used in the above Examples 1 to 4 and Comparative Examples 1 to 4, and the evaluation results of the cured films thereof are shown in Table 1.

and can be used as an optical laminate sheet for use in various electric/electronic equipment or optical equipment such as mobile devices, household electrical appliances and control equipment. For example, the laminate sheet can be used for a liquid crystal display (LCD) used for cellular phones, game instruments, mobile devices (such as smartphones and tablet PC's), car navigation systems, digital cameras, watches, calculators, televisions and personal computers; and a film- or sheet-like member such as an optical film (front panel and the like) for a touch panel, a protecting sheet for accessories, a lens protecting sheet, a decorative film, an anti-scattering film, a decorative anti-scattering film, a push-button switch (or a console panel), a membrane switch, a sensor switch and a touch-sensitive switch.

The optical film and optical sheet obtained from the curable composition of the present invention are particularly useful as a protection film/sheet and a decorative/anti-scattering film for a liquid crystal display of smartphones and tablet PC's; and as a transparent member for use in a

TABLE 1

|  |  | Examples | | | | Comparative Examples | | | |
|---|---|---|---|---|---|---|---|---|---|
|  |  | 1 | 2 | 3 | 4 | 1 | 2 | 3 | 4 |
| Composition (parts by mass) | AEO | 100 | 100 | 100 | 100 | 100 | 100 | 100 | 100 |
|  | TAIC | 33 | 33 |  | 33 | 33 | 33 | 33 |  |
|  | TAC |  |  | 33 |  |  |  |  |  |
|  | PETA | 33 | 16 | 33 | 33 | 33 | 16 |  |  |
|  | TMPTA |  | 16 |  |  |  | 16 | 33 | 25 |
|  | TPO | 0.8 | 0.8 | 0.8 | 0.4 | 0.8 | 0.8 | 0.8 | 0.8 |
|  | PH-I | 1.6 | 1.6 | 1.6 | 3.3 | 1.6 | 1.6 | 1.6 | 1.6 |
| Content of impurities derived from crosslinking aid (mass %) |  | Undetectable | Undetectable | 0.05 | Undetectable | 0.1 | 0.1 | Undetectable | 0 |
| Polyfunctional (meth)acrylic compound having a hydroxyl group (mass %) |  | 13.4 | 6.7 | 13.4 | 13.4 | 13.4 | 6.7 | <1 | <1 |
| Evaluation | Pencil hardness | 5H | 5H | 5H | 6H | 5H | 5H | 6H | 2H |
|  | Coefficient of linear thermal expansion (ppm/K) | 85 | 80 | 85 | 85 | 86 | 82 | 78 | 100 |
|  | Total light transmittance (%) | 92 | 92 | 91 | 92 | 91 | 91 | 91 | 91 |
|  | Heat discoloration resistance | 1.4 | 2.2 | 1.8 | 2.5 | 2.8 | 3.4 | 3.9 | 3.5 |

From the comparison of Examples 1 to 4 with Comparative Examples 1 to 4, it can be seen that the surface hardness is improved, coefficient of linear thermal expansion is reduced, and heat discoloration resistance is improved without reducing the total light transmission by blending an allyl group-containing crosslinking aid and a polyfunctional (meth)acrylic compound having a hydroxyl group in a molecule. Also, from the comparison between Example 1 and Comparative Example 1 and between Example 2 and Comparative Example 2, it can be seen that the content of impurities derived from the crosslinking aid has a significant effect on the heat discoloration resistance.

INDUSTRIAL APPLICABILITY

By polymerizing and curing the curable composition of the present invention, a transparent formed body having a high surface hardness, a low coefficient of linear thermal expansion and excellent heat resistance, which is suitable for optical applications, can be obtained. Hence, the curable composition is useful for optical applications such as an optical film, optical sheet, optical waveguide, optical lens, optical encapsulant, optical adhesive and light guide plate, case, a cover, a flip case and a jacket for protecting the instrument body, due to its high surface hardness and excellent transparency.

Also, by taking advantage of the heat resistance inherent to allyl ester resin, the optical film/sheet can be used as a member being exposed to high temperature and requiring transparency in a solder reflow furnace, electric furnace, infrared-ray heating furnace, hot air dryer and the like. For example, it can be applied to a window member to look inside, and a jig to prevent solder from scattering.

The invention claimed is:

1. A curable composition, which contains a crosslinking aid (B) containing an allyl group in an amount of 0.5 to 100 parts by mass, polyfunctional (meth)acrylic compound (C) in an amount of 5 to 50 parts by mass, and photopolymerization initiator (D1) and/or thermal polymerization initiator (D2) in an amount of 0.1 to 10 parts by mass, respectively, as a polymerization initiator (D) to 100 parts by mass of allyl group-terminated allyl ester oligomer (A);

wherein allyl group-terminated allyl ester oligomer has a group represented by formula (1) as terminus

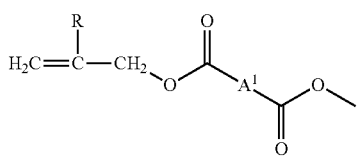

(1)

in the formula, R represents a hydrogen atom or methyl group, $A^1$ represents one or more kinds of organic residue having an alicyclic structure and/or an aromatic ring structure derived from dicarboxylic acid;

and contains a component comprising a structure represented by formula (2) as a constituent unit;

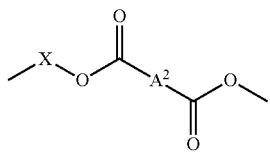

(2)

in the formula, $A^2$ represents one or more kinds of organic residue having an alicyclic structure and/or an aromatic ring structure derived from dicarboxylic acid, X represents one or more kinds of organic residue derived from polyhydric alcohol, with a proviso that X may have a branched structure through ester bonds, having a group represented by formula (1) as terminus and a structure represented by formula (2) as constituent unit, wherein the crosslinking aid (B) containing allyl group is a compound containing three or more allyl groups in a molecule;

wherein the content of impurities derived from the crosslinking aid (B) in the curable composition is less than 0.1 mass %;

wherein the polyfunctional (meth)acrylic compound (C) includes a polyfunctional (meth)acrylic compound containing a hydroxyl group in a molecule (C1) and wherein the content of the (meth)acrylic compound containing a hydroxyl group in a molecule (C1) in the curable composition is 0.5 to 30 mass %.

2. The curable composition as claimed in claim 1, wherein the crosslinking aid (B) is at least one member selected from triallyl isocyanurate (TAIC) and triallyl cyanurate (TAC).

3. The curable composition as claimed in claim 1, wherein the polyfunctional (meth)acrylic compound containing a hydroxyl group (C1) mainly comprises (meth)acrylate monomer or oligomer containing three or more (meth)acryloyloxy groups.

4. The curable composition as claimed in claim 1, wherein impurities derived from the crosslinking aid (B) contain a compound having two or less allyl groups in a molecule.

5. A transparent heat-resistant material obtained by curing the curable composition claimed in claim 1 by irradiating light and/or by heating.

6. An optical film, optical sheet, optical waveguide, optical lens, optical encapsulant, optical adhesive, light guide plate, window material or jig to prevent solder from scattering using the transparent heat-resistant material claimed in claim 5.

7. The curable composition as claimed in claim 2, wherein the polyfunctional (meth)acrylic compound containing a hydroxyl group (C1) mainly comprises (meth)acrylate monomer or oligomer containing three or more (meth)acryloyloxy groups.

8. The curable composition as claimed in claim 1, wherein the content of impurities derived from the crosslinking aid (B) is 0.05 mass % or less.

* * * * *